Dec. 8, 1964 J. W. ACKLEY ETAL 3,160,347

HIGHWAY SPRAYER

Filed March 27, 1963 10 Sheets-Sheet 1

INVENTORS
JOHN W. ACKLEY
CHARLES K. STRALOW

BY Roger C Johnson

ATTORNEY

HIGHWAY SPRAYER

Filed March 27, 1963 10 Sheets-Sheet 2

INVENTORS.
JOHN W. ACKLEY
CHARLES K. STRALOW
BY
Roger C. Johnson
ATTORNEY

INVENTORS.
JOHN W. ACKLEY
CHARLES K. STRALOW
BY
Roger C. Johnson
ATTORNEY

INVENTORS.
JOHN W. ACKLEY
CHARLES K. STRALOW

BY Roger C. Johnson
ATTORNEY

INVENTORS
JOHN W. ACKLEY
CHARLES K. STRALOW
BY
Roger C Johnson
ATTORNEY

HIGHWAY SPRAYER

Filed March 27, 1963

INVENTORS.
JOHN W. ACKLEY
CHARLES K. STRALOW
BY Roger C. Johnson
ATTORNEY

Dec. 8, 1964 J. W. ACKLEY ETAL 3,160,347

HIGHWAY SPRAYER

Filed March 27, 1963 10 Sheets-Sheet 7

INVENTORS.
JOHN W. ACKLEY
CHARLES K. STRALOW
BY Roger C Johnson
ATTORNEY

HIGHWAY SPRAYER

*INVENTORS.*
JOHN W. ACKLEY
CHARLES K. STRALOW
BY
Roger C. Johnson
ATTORNEY

INVENTORS.
JOHN W. ACKLEY
CHARLES K. STRALOW
BY
Roger C Johnson
ATTORNEY

Dec. 8, 1964 J. W. ACKLEY ETAL 3,160,347

HIGHWAY SPRAYER

Filed March 27, 1963 10 Sheets-Sheet 10

INVENTORS.
JOHN W. ACKLEY
CHARLES K. STRALOW
BY
Roger C Johnson
ATTORNEY

United States Patent Office 3,160,347

Patented Dec. 8, 1964

3,160,347

HIGHWAY SPRAYER

John W. Ackley and Charles K. Stralow, Moline, Ill., assignors to Deere & Company, Moline, Ill., a corporation of Delaware Filed Mar. 27, 1963, Ser. No. 268,366
16 Claims. (Cl. 239—159)

This invention relates generally to spraying apparatus and more particularly to highway sprayers for distributing growth-controlling chemicals along the roadside.

The object and general nature of this invention is the provision of a truck-mounted spraying apparatus adapted to be supported as a unit within the body of a truck or the like and having a laterally outwardly extending spray boom shiftable both vertically and fore and aft by power means.

Specifically, one important feature of this invention is the provision of a new and improved boom support shiftably mounted for swinging in a generally horizontal plane and including an operator's seat disposed adjacent the controls for the spray distribution and swingable as a unit with the boom support. Another feature of this invention is the location of the operator's seat so that he has a clear substantially unobstructed view not only of the spray pattern and the spray operation but also an excellent view of the oncoming roadway as the outfit travels down the highway.

Another feature of this invention is the provision of a highway sprayer that comprises a self-contained unit made up of a tank, an engine-driven pump and a shiftable boom and boom support, including a seat for the operator, all being particularly adapted to be mounted in the bed of a truck or trailer and so constructed and arranged that the unit may be mounted in the position having the boom project laterally from the right side of a truck or trailer, or projecting from the left side, as desired.

Another feature of this invention is the provision of means for protecting the boom so as to permit the latter to swing rearwardly if, for example, the boom accidentally strikes an obstruction while the outfit is moving forwardly.

An additional feature of this invention is the provision of a truck-mounted highway sprayer in which an independently controlled truck-side nozzle attachment is provided for spraying areas immediately adjacent the payment, such as inside the associated guard rails, against banks or other narrow rights of way where boom spraying is not required. Still further, another feature of this invention is the provision of an auxiliary support for the boom in which the latter extends forwardly closely alongside the truck or other conveyance.

These and other objects and advantages of the present invention will be apparent to those skilled in the art after a consideration of the following detailed description, taken in conjunction with the accompanying drawings, in which.

Figure 1:
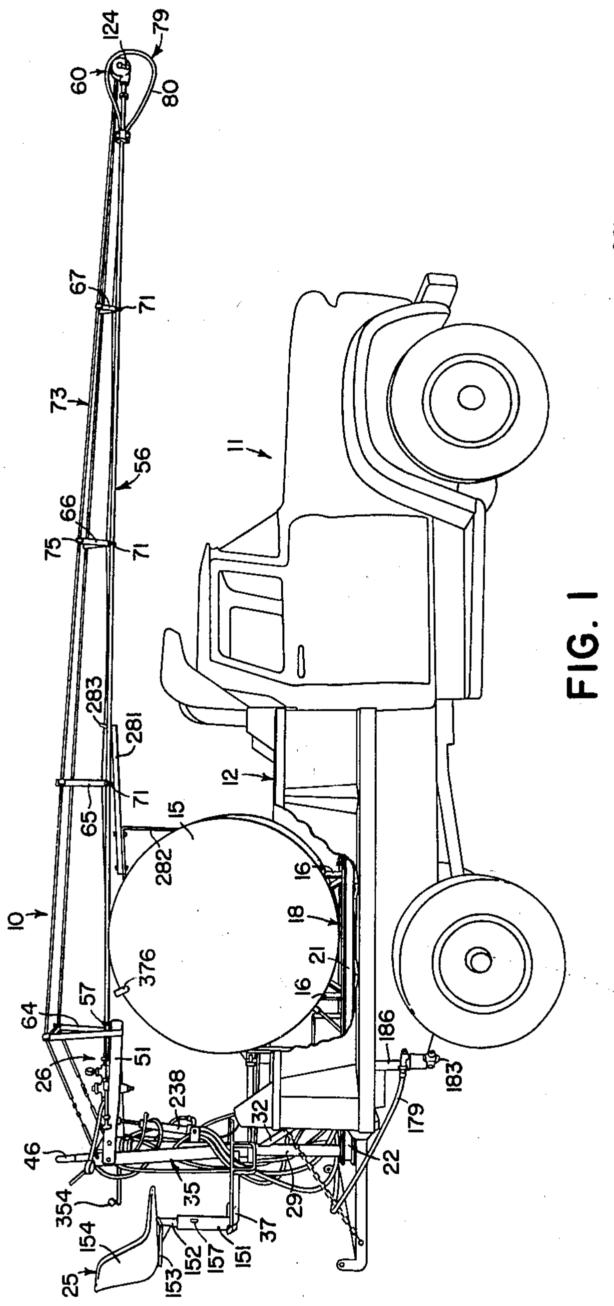
FIG. 1 is a side view of a truck-mounted highway sprayer in which the principles of this invention has been incorporated.

Referring now to the drawings, the spraying means of this invention is shown by way of illustration at 10 as mounted on or supported in a conventional commercial truck 11 having a bed or body 12, the rear side of which is broken away to show certain details of the spraying means 10. The latter includes a tank 15 of generally cylindrical construction fixed by side bars 16 to associated channels 17 of a main frame 18. The latter also includes a peripheral channel member 21 of generally rectangular configuration and shaped to include a rear extension frame portion 22 carrying a supporting structure 23 that receives not only an operator's seat 25 but also a boom structure 26. Means to this end will be described below. The frame 18 is fastened by any suitable means to the truck body, and the tank members 16 are fixed by any suitable means to the frame 18.

The supporting structure 23 carried by the frame extension 22 includes an upright pipe or pedestal in the form of a tubular member 29 welded at its lower end to a bracket 31 and connected at its generally central portion to downwardly extending diagonal braces 32 and 33. The upper end portion **29*a* (FIG. 3) of the member 29 extends upwardly and forms a standard receiving a combined seat support and boom pivot indicated in its entirety by the reference numeral 35**.

The member 35 includes an upper yoke section 36 and a lower platform section 37, both sections being welded to a central sleeve or pipe section 38 adapted to be passed over the upper standard section **29*a* and to rotatably bear at its lower end on a supporting flange 41 fixed, as by welding, to the standard 29. The yoke 36 includes generally upwardly and outwardly extending channels 43 and 44 welded at their lower ends to the sleeve 38 and having parallel upwardly extending portions 43*a* and 44*a*. The latter are rigidly interconnected by a transverse bar 45 to an end portion of which an upwardly extending grip bar 46** is welded.

The boom 26 is pivotally connected with the upper end of the yoke section 36. The boom 26 includes a boom yoke 51 comprising a bifurcated structure having parallel sides 52 apertured to receive cap screws 53 and associated bushings on which the yoke ends 52 are swingable and which are fixed securely to the upper ends of the channel bars 43 and 44 when the cap screws 53 are tightened. A boom pipe 56 is fixed at its laterally inner end to the outer portion of the boom yoke 51 by a pair of U-bolts 57 which clamp the boom pipe 56 to a pair of apertured pads or brackets 58 carried by the outer end portion of the boom yoke 51.

Figures 2, 11:
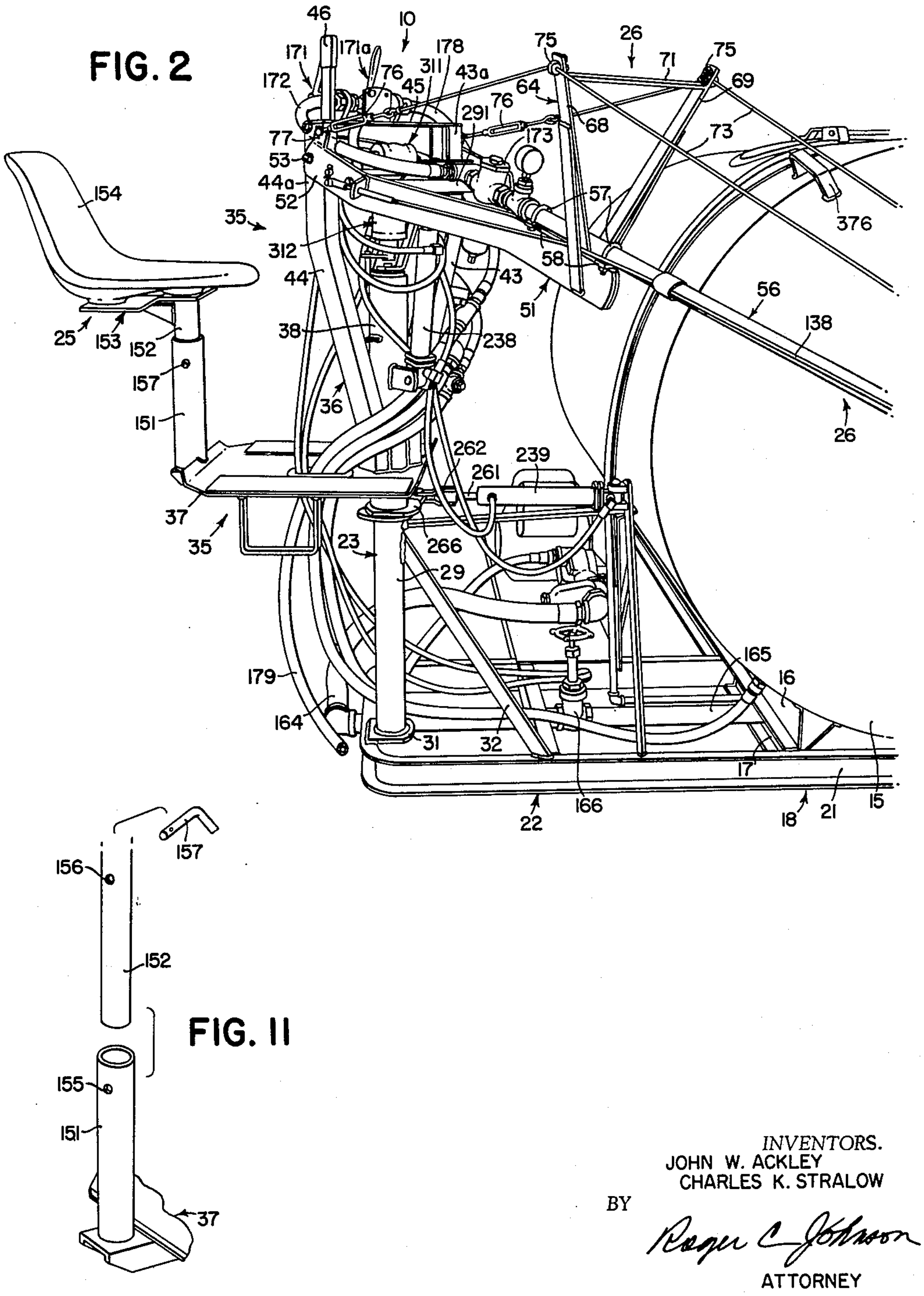
FIG. 2 is a perspective view of the rear portion of the spray tank and principal parts of the highway sprayer shown in FIG. 1.
FIG. 11 is a fragmentary exploded perspective view of portions of the seat support.
Figures 3, 4, 5:
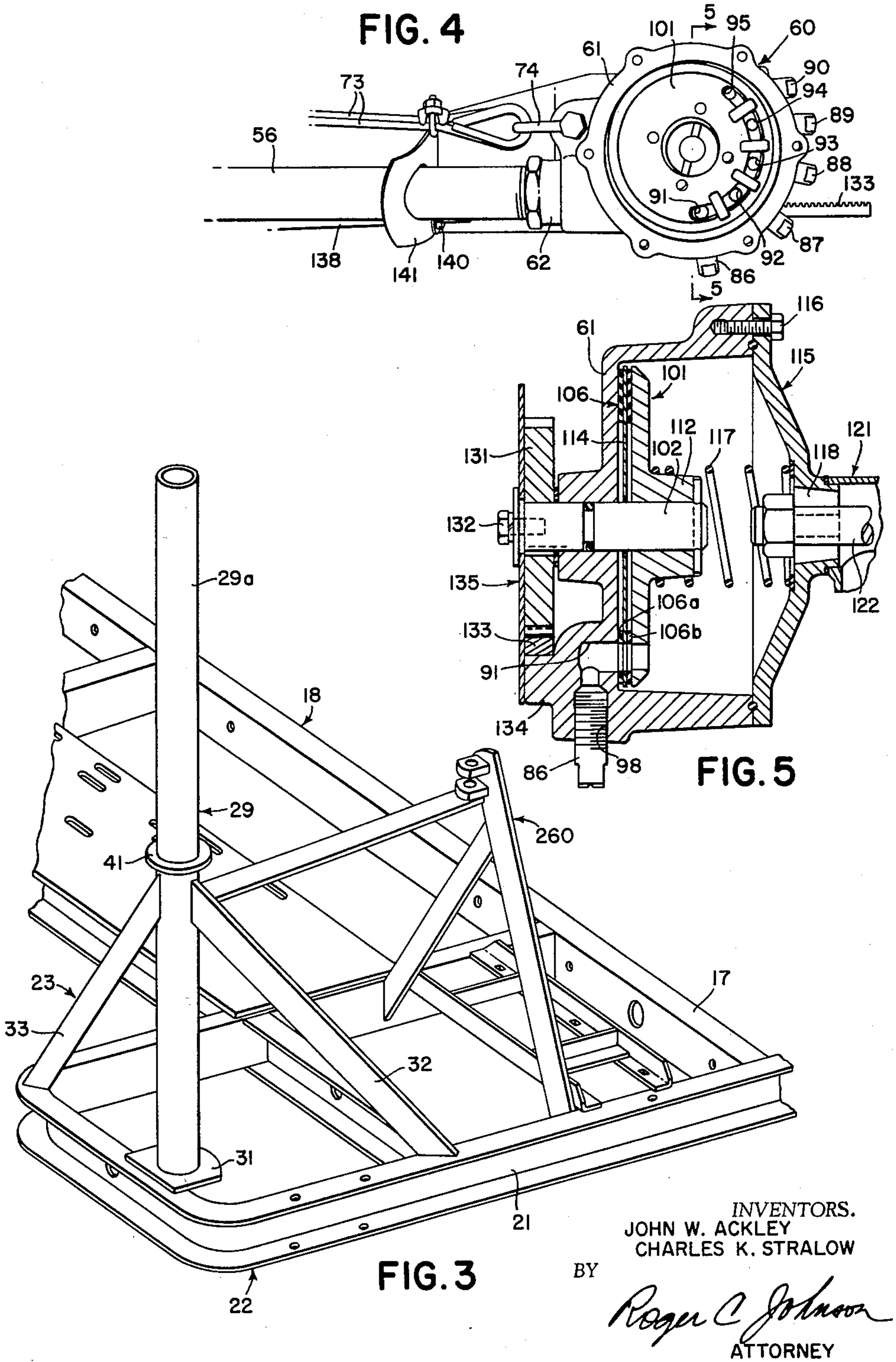
FIG. 3 is a fragmentary perspective view of a portion of the tank-supported main frame.
FIG. 4 is an enlarged view of the nozzle head and associated parts, with the cover plate removed to show the interior of the nozzle head.
FIG. 5 is a generally central section, taken along the line 5—5 of FIG. 4, but with the nozzle port seal, selector plate and cover plate in position.

As best shown in FIGS. 1 and 4, the boom pipe 56 carries at its outer end a nozzle head 60 of special construction, which will be described in detail later and which includes a nozzle housing 61 having a screw threaded connection 62 with the outer end of the boom pipe 56. The latter is reenforced against vertical deflections by a plurality of truss supports 64, 65, 66 and 67 (FIG. 1) of various dimensions, support 64 being the largest in vertical dimension and comprising a pair of upwardly diverging bars 68 and 69 fixed at their lower ends to the outer end of the boom yoke 51 and reenforced at their upper ends by a cross strap 71. The other supports 65, 66 and 67 are of similar construction but are clamped at their lower portions directly to the boom pipe 56 by U-bolts 71. Tension means in the form of a cable 73 is at its laterally outer portion looped through an eye 74 (FIG. 4) on the outer nozzle housing 61 and the inner end portions extend laterally inwardly through supporting U-bolts 75 carried by the upper portions of the truss supports 64–67. The innermost ends of the cable 73 are connected by adjustable turnbuckles 76 (FIG. 2) to brackets 77 fixed to the inner end portions 52 of the yoke 51. When the turnbuckles are tightened to the proper degree the boom pipe 56 is carried with no objectionable deflection. A guard 79 surrounds the nozzle head 60 to protect the latter from accidental contact with objects along the roadside and includes an enclosing dielectric cover 80.

The nozzle head 60, which is carried at the outer end of the boom pipe 56, includes the housing 61 which is provided with a plurality of peripherally disposed extension nozzles 86, 87, 88, 89 and 90 extending in fan-shape array, as shown in FIG. 4. These nozzles are per se generally of conventional construction, the housing having passageways 91, 92, 93, 94 and 95 by which the nozzles 86–90 communicates with the interior of the housing. The latter also has a passageway 96 with a threaded portion receiving the outermost end of the boom pipe 56, which supplies spray material to the interior of the housing 61.

As best shown in FIG. 5 each of the passageways 91–95 extends directly from the interior of the housing 61 at right angles to the plane of the bottom 97, being joined at its inner end to a perpendicular bore 98 that is coaxial with the axis of the associated nozzle body. This passageway arrangement eliminates the transmission of swirling movement of the spray fluid, entering the housing 61 more or less tangentially through the connection 62, to the liquid as it moves outwardly toward the nozzles 86–90.

Rockably disposed within the housing 61 is a generally circular selector plate 101 fixed to a shaft 102 rockable in the housing. The selector plate 101 has an arcuate slot 104 extending for about 100° and, in one position of the selector plate, the arcuate slot 104 embraces or overlies all of the openings 91–95. By turning the plate 101 one or more of the openings 91–95 will be covered so as to shut off the associated nozzle or nozzles progressively. A nozzle port seal 106 has openings corresponding to the openings 91–95, with an additional opening 109 to receive a stud 110 on the housing to position the nozzle port seal. The selector plate 101 has a hub 112 notched to receive a pin 113 that passes through an opening in the outer end of the shaft 102. This fixes the selector plate 101 to the shaft 102.

The nozzle port seal 106, as best shown in FIG. 5, comprises a metal plate 114 having apertured circumferential non-metallic rings 106*a* and 106*b* bonded to the edge portion of the plate 114. The latter has a central opening 106*c* to receive the shaft 102.

Figures 6, 7, 8:
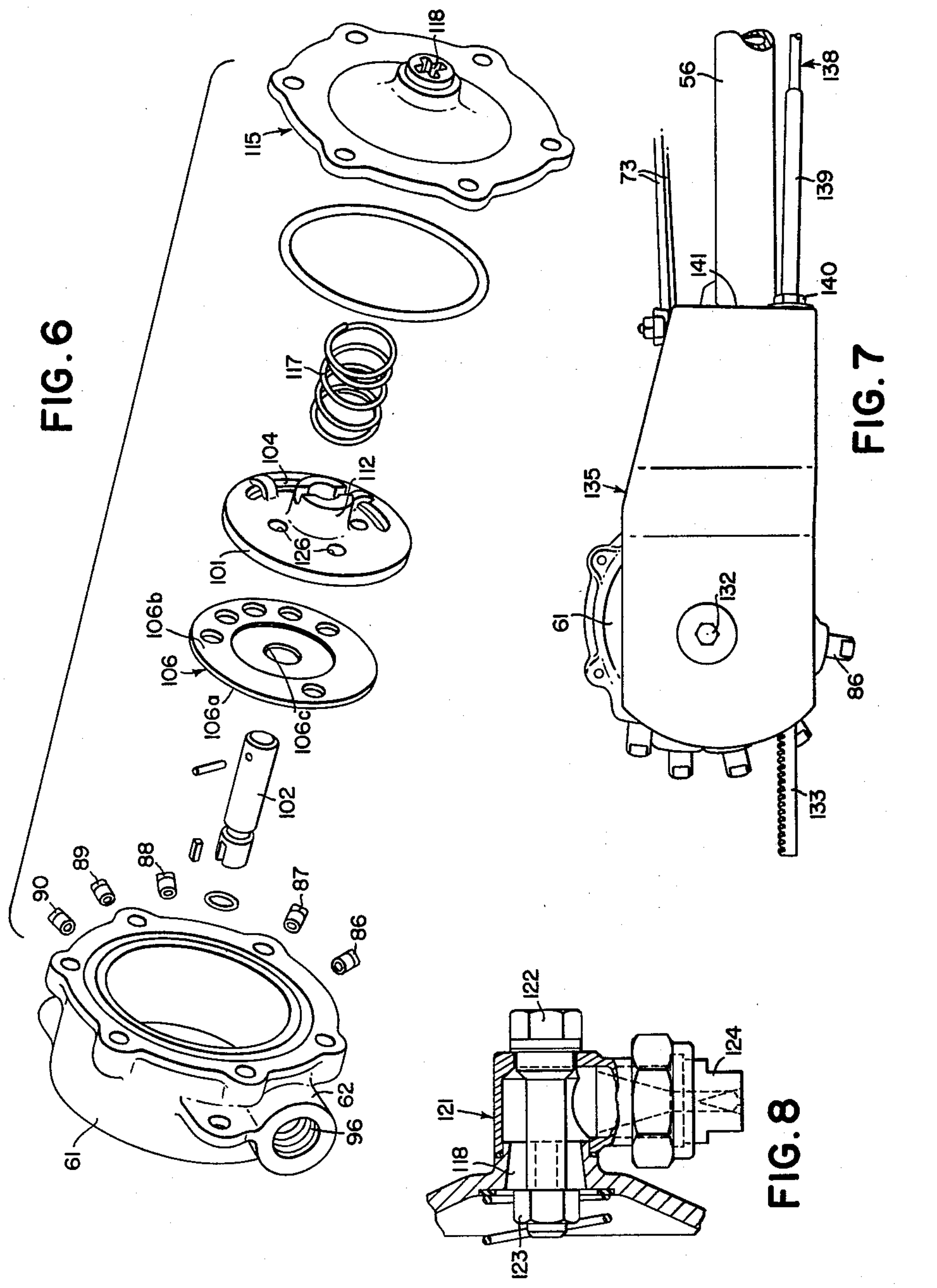
FIG. 6 is an exploded view showing certain parts of the nozzle head in perspective.
FIG. 7 is an elevation of the nozzle head showing the back or rear side thereof.
FIG. 8 is a generally central section taken through the main boom.

As best shown in FIG. 6, one side of the nozzle housing 61 is open to permit the insertion of the nozzle port seal 106 and the selector plate 101. This side of the housing is closed by a cover plate 115 that is adapted to be fixed to the housing by cap screws 116. A spring 117 is confined between the plate 115 and the selector plate 101, the spring 117 having an end encircling the hub 112 which serves to hold the spring centered and in the proper position in the housing.

The central portion of the cover plate 115 has a cross-shaped central opening 118 to receive a main boom nozzle body 121 which is adjustably fixed in place on the cover plate 115 by a bolt 122 that extends through the nozzle body 121 and the cross-shaped opening 118 and into a nut member 123 on the inside of the cover plate 115. The shape of the opening 118 permits liquid to flow from the inside of the housing 61 out through the cover plate 115 into the nozzle body 121. The purpose of adjusting the nozzle body 121 is to secure the desired spray pattern. A nozzle 124 is carried by the body 121 and is adjusted to direct a flow of spray material laterally inwardly from the nozzle head 60. The other nozzles 86–90 direct spray material laterally outwardly, delivering material to greater or lesser distances laterally according to the number of nozzles 86–90 opened by moving the nozzle selector plate 101 to different positions.

The selector plate 101 is provided with one or more central openings 126 that permit some of the pressure of the spray fluid within the housing to be applied to the inner side of the plate 101, thus reducing the pressure of the selector plate 101 on the nozzle port seal ring 106.

Manually controlled means is provided for shifting the position of the selector plate 101. To this end a gear 131 is fixed to the outer end of the shaft 112, which is the end that projects through the bottom wall of the housing 85. The gear 131 is keyed to the shaft 112 and is held in position thereon by a cap screw 132. A reciprocable rack 133 meshes with the gear 131 and slides along a shelf or support 134 on the housing 61. A rack retainer plate 135 is held on the outer end of the shaft by the set screw 132 and is dimensioned to overlap the rack 133 and thus retain the latter in proper position. A push-pull Bowden cable 138 (FIGS. 7 and 19) extends along the boom pipe 56 and has the inner movable member thereof fixed at its outer end in any suitable way to the inner end of the rack 133. The sheath or enclosing tube 139 of the cable 138 is fixed by a pair of lock nuts 140 to the inner end 141 of the plate 135, which is apertured to engage over the pipe 56 (FIG. 4), and the inner end of the cable 138 includes a sleeve section 142 that is adjustably carried by a bracket 143 and held in different positions of adjustment by a pair of lock nuts 145. A handle 146 is fixed to the inner end of the cable plunger 148 that is slidable in the sleeve 142 and connected to the inner rack-operating member of the cable 138. Pulling or pushing on the handle 147 serves to shift the rack 133 and turn the gear 131, thus shifting the selector plate 101 and opening or closing one or more of the nozzles 86–90. Preferably, the parts are so constructed and arranged that when the handle 147 is pushed all the way in the sleeve 142 all of the nozzles are opened.

It will be remembered that the main boom nozzle body 121 is open continually to the interior of the nozzle housing 85 so that the nozzle 124 delivers a spray laterally inwardly whenever the boom pipe 56 is opened to fluid pressure. As mentioned above the nozzle 124 is directed generally laterally inwardly and in one practical form of this invention the spray from nozzle 124 covers approximately twenty feet measured from a point on the ground substantially directly underneath the nozzle head 60. The other nozzles 86–90 are controlled by the extension nozzle control handle 146. When the handle 146 is pulled all the way back, or inwardly toward the operator's seat, referred to below, all of the extension nozzles are closed. That is, the aforesaid movement of the handle 146 swings the selector plate into a position closing off all of the openings 91–95. Then, as the handle 146 is pushed outwardly toward the outer end of the boom the opening 91 is first opened and liquid discharged from nozzle 86, adding a spray of about four feet to the twenty-foot coverage mentioned above. Pushing the handle 146 farther outward progressively opens the other nozzles 87, 88, 89 and 90, at which time the spray pattern covers approximately forty feet. Thus, the spray pattern may be reduced by steps from forty feet to twenty feet or back to forty feet again, as desired. This permits the operator to avoid applying the spray to objects, persons or the like alongside the pavement, which may be injurious or otherwise objectionable.

Referring again to the combined seat support and boom pivot member 35, this member comprises, in addition to the parts mentioned above, a vertical pipe section 151 (FIG. 1) fixed at its lower end to the rear or outer portion of the platform 37. The operator's seat structure 25 includes a seat pivot member in the form of a vertical pipe 152 fitting rotatably within the pipe 151 and carrying a head 153 to which the seat proper, indicated at 154, is fixed. Registering holes 155 and 156 (FIG. 11) are formed in the pipes 151 and 152 and removably receive a seat pin 157. The pin 157 normally holds the operator's seat from turning relative to the platform 37, but during transport, for example, it may be desirable to remove the seat 25, which may be done easily after taking out the pin 157.

Figure 9:
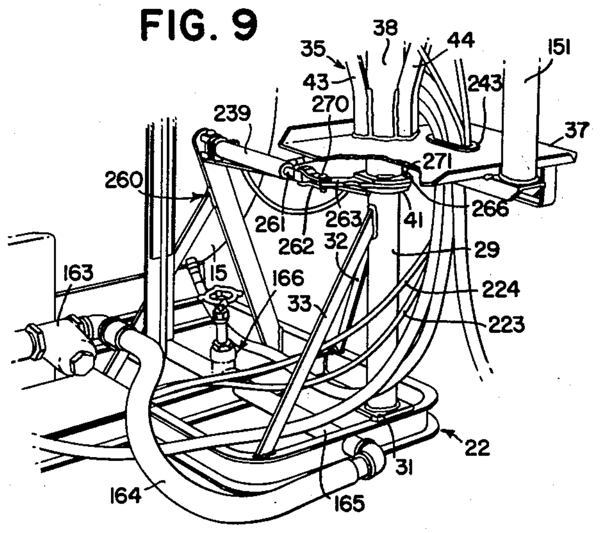
FIG. 9 is a fragmentary perspective view of certain portions of the seat and boom swinging means and the tank frame on which these parts are carried.
Figure 10:
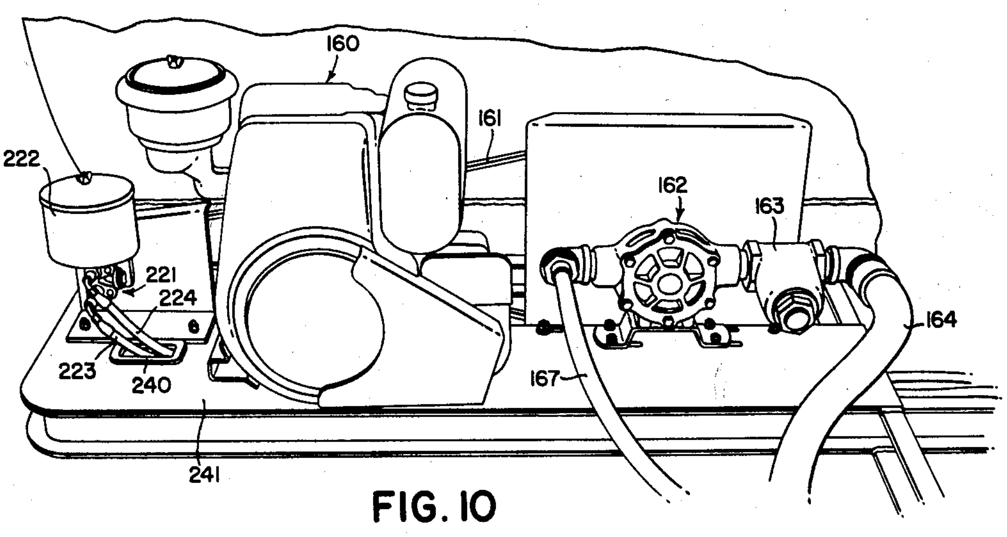
FIG. 10 is a fragmentary perspective view of the spray pump and engine for driving it, together with other related structure.

According to this invention, power is provided for drawing spray material from the tank 15 and delivering it under pressure for application to the outer side of the trunk so as to destroy or minimize vegetation alongside the highway to eliminate mowing as far as possible. The material to be sprayed may be fertilizer, growth regulators, or the like. Referring first to FIGS. 9 and 10, a small internal combustion engine unit with appurtenant parts, indicated at 160, is connected by power transmission means in the form of a belt or chain 161 trained over a pulley 159 (FIG. 12) to drive a pump 162 which is connected through a strainer 163, a pump supply hose line 164 and a pipe 165 with the tank 15 to draw liquid therefrom. A gate valve 166 is interposed in pipe 165. The pump 162 delivers liquid under pressure through a hose 167, a pressure regulating valve 168 (FIG. 12), a hose 169, a quick-opening valve 171, and a hose 172 to the inner end of the boom pipe 56 through a flow regulating valve 173. A pressure gauge 174 is connected to indicate the operating pressure in the boom pipe 56.

The pressure regulating valve 168, quick-opening valve 171, flow regulating valve 173 and pressure gauge 174 are per se conventional units.

A second quick-opening valve 171*a* connects a hose 178 with a second pressure regulating valve 168*a*, and a hose 179 connects the valve 168*a* to a side nozzle 183 with which a pressure gauge 184 is connected. As will be seen from FIG. 1, the side nozzle 183 is fixed to a bracket 186 that is attachable to the truck bed and is used when the zone immediately adjacent the roadway is to be sprayed. If desired, however, the side nozzle 183 may be used in conjunction with the boom nozzles 86–90 and 118. The pressure in the lines leading to the nozzles 86–90, 118 and 183 is controlled by the pressure regulating valve 168.

Figure 12:
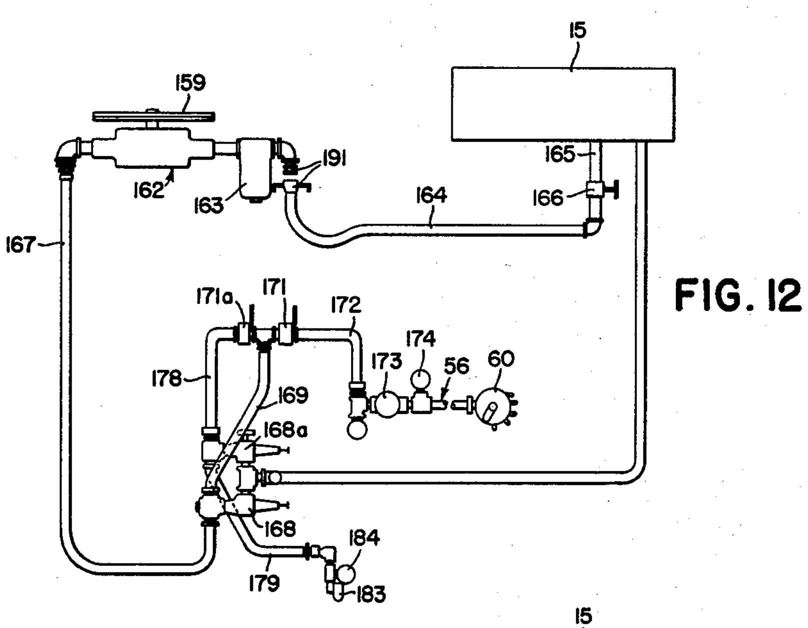
FIGS. 12 and 13 are diagrammatic views of the various hose lines and associated valves and regulators.

The pump supply hose 164 is connected with the strainer 163 by a quick detachable shank type coupler 191. The tank 15 may readily be drained by releasing the coupler 191 (as indicated in FIG. 12) and throwing the outer end of the hose 164 over the side or rear of the truck, thus permitting liquid to drain freely from the tank 15 to the ground.

Figure 13:
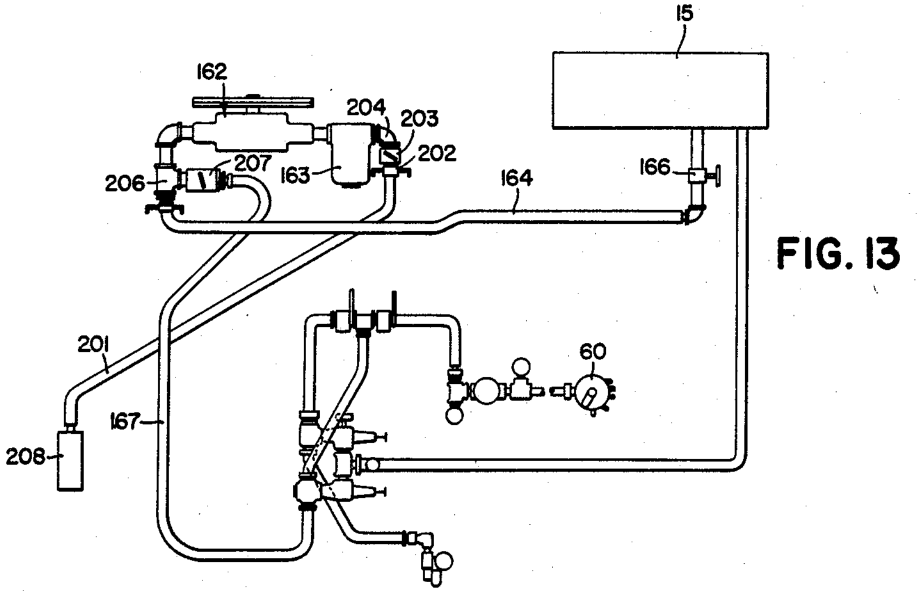

In FIG. 13 there is shown a slightly different arrangement of the spray hoses. In this form of the invention provision is made whereby water for making up the spray material may be drawn from a nearby stream or other adjacent body of water and forcibly discharged into the tank 15. To this end a relatively long suction hose 201 is provided and is equipped at one end with a quick detachable shank type coupler 202 by which the suction hose 201 may be connected to the inlet of the strainer 163 after the hose 164 (FIG. 12) is disconnected. In this form of the invention, as shown in FIG. 13, there is a swing check valve 203 interposed between the strainer inlet 204 and the suction hose 201. At the discharge or high pressure side of the pump 162 there is a T coupling 206 and a swing check valve 207 to which the hose 167 is connected.

In the arrangement shown in FIG. 13, to fill the tank 15 from a nearby pond, reservoir, stream or the like, the hoses will be connected as shown in FIG. 13 and the gate valve 166 opened. The outer end of the hose 201 will be thrown into the source of water, making sure that the strainer 208 is completely submerged. The engine 160 is then started and the pump 162 will draw water in through the suction hose 201 and force it into the tank 15 through hose 164. The check valve 207 is provided for the purpose of preventing fluid in the spray pipes and hoses from draining back into the pump 162 when the latter stops, but when filling the tank 15 by the arrangement shown in FIG. 13, only a limited amount of water, or none at all, will be forced into the spray pipes because the springs in the pressure regulating valve 168 and 168*a* usually will not open under pressures below that comparable to the maximum head of the liquid in tank 15. The desired chemical may be added to the tank 15 either during or after filling with water. After the tank 15 is filled, as just described, the suction hose 201 is disconnected from the check valve 203 and the hose 164 connected to the check valve 203. The hose 167 is disconnected from the check valve 207 and connected to the T206 so that the connection shown in FIG. 12 is reestablished. Then any suitable cap is used to close the end of the T206 so that when the pump 162 is subsequently operated, spray material from the tank 15 will be delivered under pressure to the spray pipes and hoses through the hose 167.

According to this invention, the boom 26 may be raised or lowered and/or swung around generally horizontally, as desired, depending on how it is desired to distribute the spray material. Preferably, according to this invention, we employ hydraulic power, and means to this end will now be described.

Referring again to FIG. 10, the engine unit 160 also includes a pump 221 driven in any suitable manner from the engine 160, an oil reservoir 222 supplying oil to the pump, and high and low pressure lines 223 and 224, respectively. The pump 221 is, according to this invention, utilized to raise and lower the boom 26 by extending or retracting a generally vertical power cylinder 238 (FIGS. 1 and 2), and to shift the boom 26 and the associated supporting structure 23 generally in a horizontal plane by extending and retracting a generally horizontal power cylinder 239 (FIG. 9). The pump is also provided with an overload release (not shown) of conventional construction.

For shifting the spray boom and associated nozzle horizontally or vertically, this invention provides a controllable connection between the pump 221, with its associated high and low pressure lines 223 and 224, and the boom-operating cylinders 238 and 239. This controllable connection will now be described.

The pump hoses 223 and 224 extend down through a grommet 240 (FIG. 9) in the base plate 241 to which the engine 160 is fixed, and pass underneath the plate 241 and then extend generally upwardly through a second grommet 243 in the platform section 37 to manually controlled hydraulic power means operative to swing the spray boom and nozzles at the outer end thereof generally vertically and the spray boom and nozzles, together with the seat supporting structure 35 and platform 37 horizontally, generally about the axis defined by the tubular member or standard 29 as a center.

Figure 18:
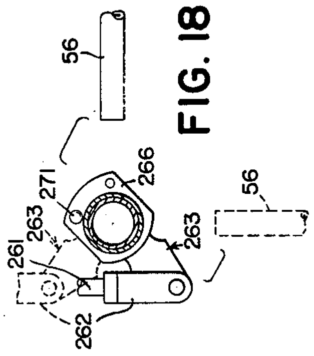
FIG. 18 is a diagrammatic view illustrating two positions of the spray boom.

As will be seen from FIG. 9, the power cylinder 239, which is included in the above mentioned hydraulic power means, is connected at one end with bracket means 260 which is so constructed as to be rigid with the frame extension 22. The piston 261 of the power cylinder 239 is connected at its outer end through a link 262 with an arm 263 loosely mounted for horizontal swinging about the upper end portion of the standard 29 between the flange 41 thereon and an upper flange 266 on the lower end of the pipe section 38 that forms a part of the combined seat and boom pivot 35. There are two holes 267 and 268 (FIG. 17) in the large end of the arm 263 and the small end of the arm 263 has a hole 269 that receives the pivot pin 270 that connects the arm with the link 262 (FIG. 9). Normally, that is, when the boom 56 is in an outwardly extending operating position (FIG. 18), extending outwardly from the right side of the truck 11, the arm 263 is locked to the flange 266 on the pipe section 38 by inserting a connecting pin 271 through an opening in the flange 266 and the opening 268 in the arm 263. Thus, as indicated in diagrammatic FIG. 18, when the cylinder 239 is extended the arm 263 is swung back and the boom support 35 turned to cause the boom 56 to extend directly outwardly (full lines, FIG. 18). When the cylinder 239 is retracted (dotted lines, FIG. 18) the boom 56 is swung rearwardly to an in-line position so as to clear obstructions along the side of the road or pavement. At this time, of course, the spray valves 171, 171*a* (FIGS. 10 and 19) are closed.

When the swing cylinder 239 is in an extended position and the pin is in place, the boom 56 extends outwardly from the side of the truck. In this position, the connecting pin 271 serves as a shear pin, which shears if the boom 56, in its laterally outwardly extending position, should strike an obstruction. When the cylinder 239 is retracted the boom 56 is swung rearwardly (dotted lines, FIG. 18) to a position alongside the truck so as to clear obstructions and the like.

Further, whenever it is desired to transport the outfit from one spraying area to another, the pin 271 may be manually withdrawn, which frees the boom and associated parts from connection with the swing cylinder 239, after which the boom may then be swung forwardly to a transport position alongside the end of the tank 15 and the side of the truck. In the transport position shown in FIG. 1, the boom 56 may be carried on a boom transport bar 281 that is fixed at its rear end to a tank-carried bracket 282. At its forward end the bar 281 carries a boom clamp 283 which is manually adjustable to selectively clamp the boom 56 in its forward or transport position.

Under certain conditions it may be desirable to distribute spray material from the left side of the truck, rather than from the right side, the usual arrangement. In order to provide for left side distribution, it will be necessary first to disconnect the sprayer frame 18 from the truck body and then lift the entire sprayer means 10 up off the truck body; turn it around through 180° so that the boom 56 extends over the left side of the truck, and then reconnect the fasteners that hold the sprayer frame to the truck body.

Figure 17:
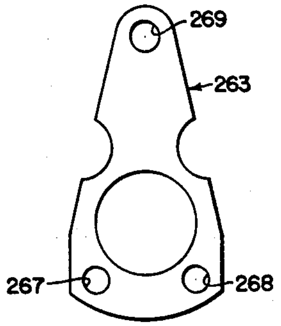
FIG. 17 is a plan view of the boom-swinging arm.

When the boom is extended toward the left side, the pin 211 is passed through the opening in flange 266 and the other opening 267 in the arm 263 (FIG. 17). Now extension of the cylinder 239 will swing the boom rearwardly alongside the rear of the truck and retraction of the cylinder 239 will swing the boom to an outwardly extending position.

The power cylinder 239, whose action and operation is described above, forms one part of the above described manually controlled power means. The other part of said power means includes the vertical cylinder 238 that is operative to raise and lower the boom 56. The upper end of the cylinder 238 (FIGS. 1 and 2) is connected with the boom yoke 51 at a point spaced from the axis defined by the cap screws 53. This point preferably is defined by a cross shaft 291 (FIGS. 2 and 19) disposed between the boom yoke sides 52 and pivoted thereto by cap screws 292 or the like. The piston rod 293 (FIG. 19) extends upwardly into a socket 294 carried by the central part of the cross shaft 291. The lower portion of the cylinder 238 is connected by a pivot pin 296 to a pair of bracket lugs 297 fixed to the lower portion of the central pipe section 38. Extension and retraction of the cylinder 238 serve to raise and lower the boom 56 generally vertically.

Control of the hydraulic fluid flowing to and from the cylinders 238 and 239 is secured by means now to the described.

Figure 16:
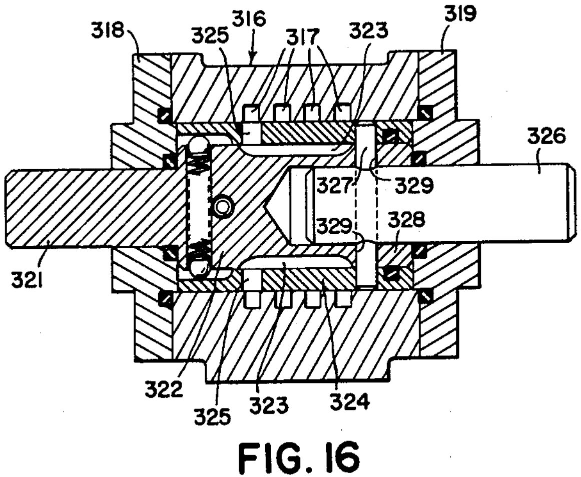
FIG. 16 is a sectional view of one of the two hydraulic valves used to shift the boom from one position to another.
Figure 15:
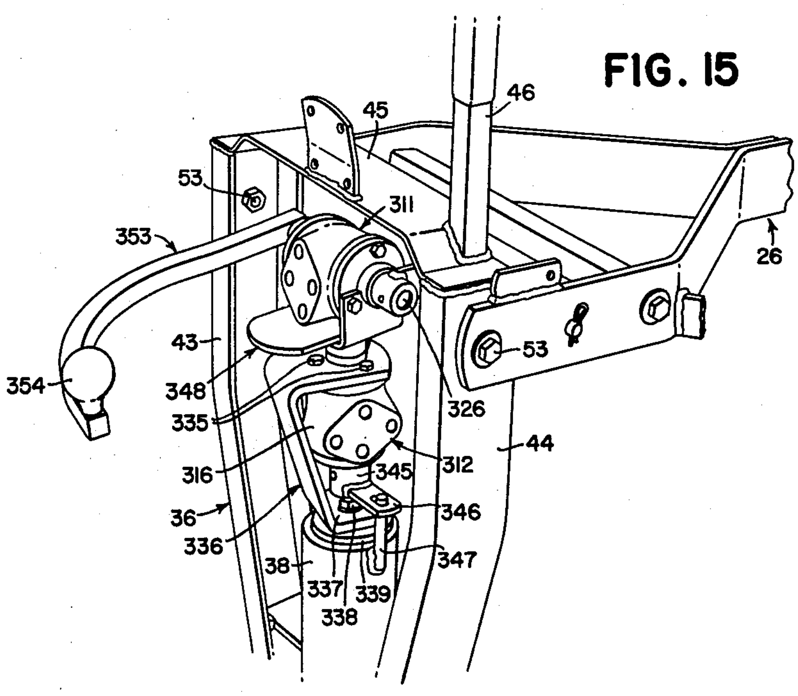
FIG. 15 is a perspective view of the boom-shifting hydraulic valve units.

A pair of hydraulic valves 311 and 312 (FIG. 15) are mounted in the upper portion of the yoke section 36. These valves 311 and 312 are per se identical, being power steering valves adapted primarily for use in automotive vehicles and disclosed and claimed in U.S. Patent 2,939,429 issued June 7, 1960 to Lynn L. Charlson, to which reference may be made if desired. Briefly, each of the valve units 311 and 312 comprises a housing 316 (FIG. 16) having four interiorly disposed circumferentially extending grooves 317 and end caps or closures 318 and 319. End cap 318 receives a primary control shaft 321 of which a spool 322, disposed rotatably within the housing, forms an integral part. A plurality of axially extending channels 323 are formed in the spool 322 and communicate variously with the housing grooves 317, depending on the position of the sleeve 324 in which a plurality of radial openings 325 are formed. A follower or secondary control shaft 326 is mounted for limited rotary or oscillatory movement in one end of the sleeve 324 and is connected by a pin 327 to the hollow end 328 of the primary control shaft 321. The pin 327 extends through a pair of circumferentially extending slots 329, the length of which determines the amount of available lost movement between shafts 321 and 326.

According to this invention we provide means for mounting the valves 311 and 312 between the channels 43 and 44 of the yoke 36. To this end the upper valve 311 is mounted with its shafts 321 and 326 generally horizontal while the lower valve 312 is mounted with its shafts 321 and 326 generally vertical. The lower or vertical valve 312 has its housing 316 fixed at its upper end by cap screws 335 to the upper portion of a U-shaped bracket 336, the lower portion 337 of which is bolted, as at 338, to a plate 339 fixed to the upper end portion 29*a* of the tubular vertical frame member 29. Thus, the bracket 336 is held rigidly relative to the main frame 18, and the housing 316 is held rigidly to the bracket 336. The lower shaft 326 of the valve 312 carries a follower collar 345 rigidly connected by a roll pin to the shaft 326 and the collar 345 carries a slotted arm 346, the slot of which reseives a pin 347 that at its lower end is welded or otherwise fixed to the upper end of the sleeve 38 which swings around the vertical tubular section 29 when the cylinder 239 (FIG. 9) is extended or retracted.

Figure 19:
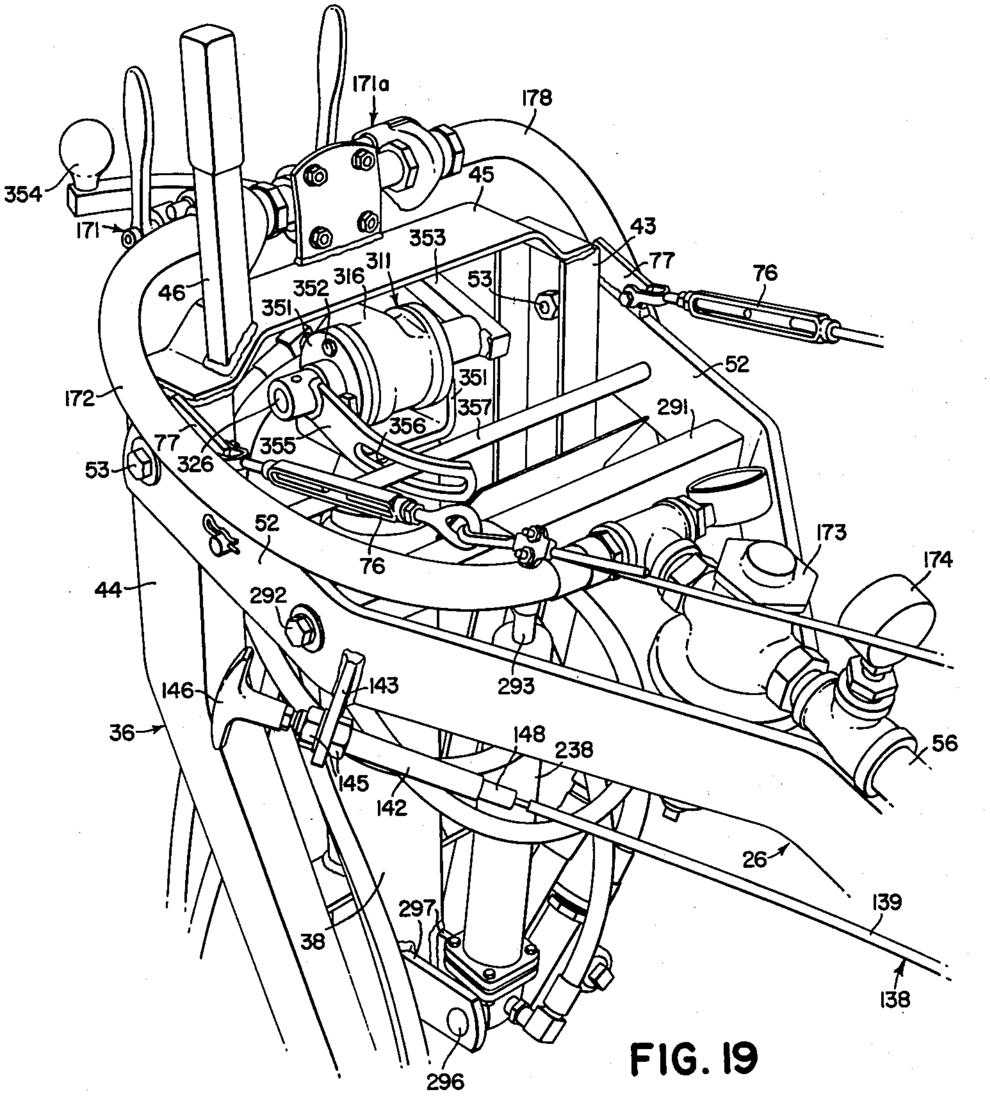
FIG. 19 is a fragmentary perspective view of a portion of the boom-swinging hydraulic mechanism, including a pair of valve units.
Figure 20:
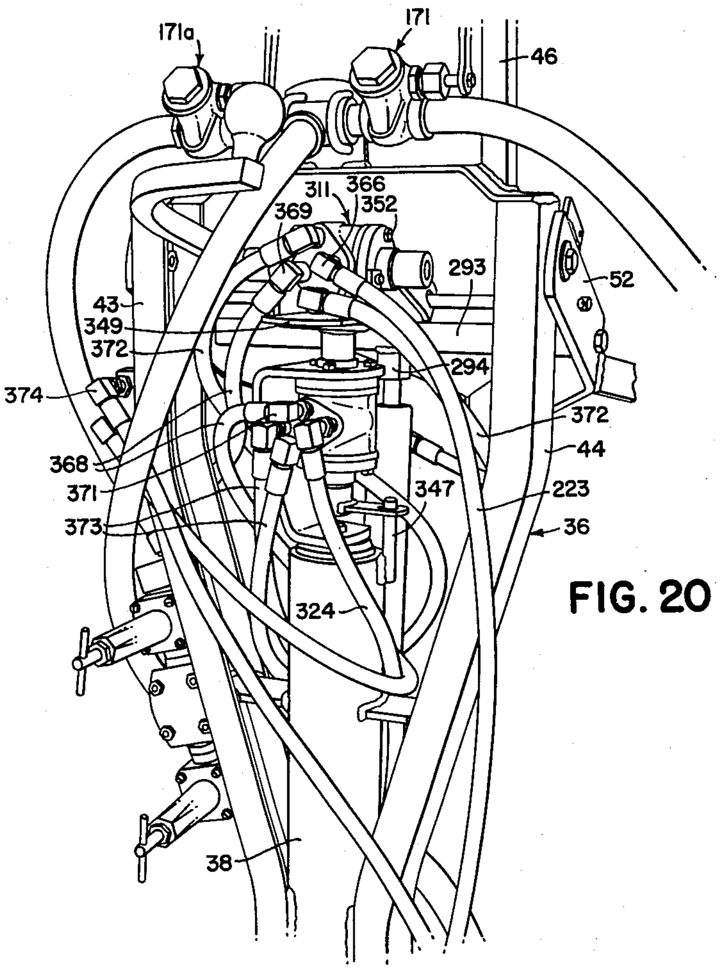
FIG. 20 is a fragmentary perspective view showing the other side of the parts shown in FIG. 19.

The upper valve 311 is mounted on the upper primary control shaft 321 of the lower valve 312 by means of an upper valve mounting bracket 348 which comprises a horizontal portion 349 (FIG. 20) and a pair of upwardly extending ears 351 (FIG. 19) to which the ends of the housing 316 of the upper valve 311 are fastened in any suitable way as by cap screws 352 (FIG. 20). The primary control shaft 321 of the upper valve 311 carries fixed thereto an operating lever 353 that is curved so as to present a handle section 354 conveniently accessible to an operator on the operator's seat 154 (FIG. 1). The secondary control or follower valve shaft 326 (FIG. 19) of the upper valve carries a follower arm 355 which carries a slot 356 at its outer end through which a rod 357 extends. The rod 357 is supported in the sides 52 of the boom yoke 51 by extending through openings therein (FIG. 19).

Inasmuch as the details of the valve 311 are fully disclosed and claim in U.S. Patent 2,939,429, mentioned above, it is not deemed necessary to describe all of the various hydraulic circuits and associated parts.

Figure 14:
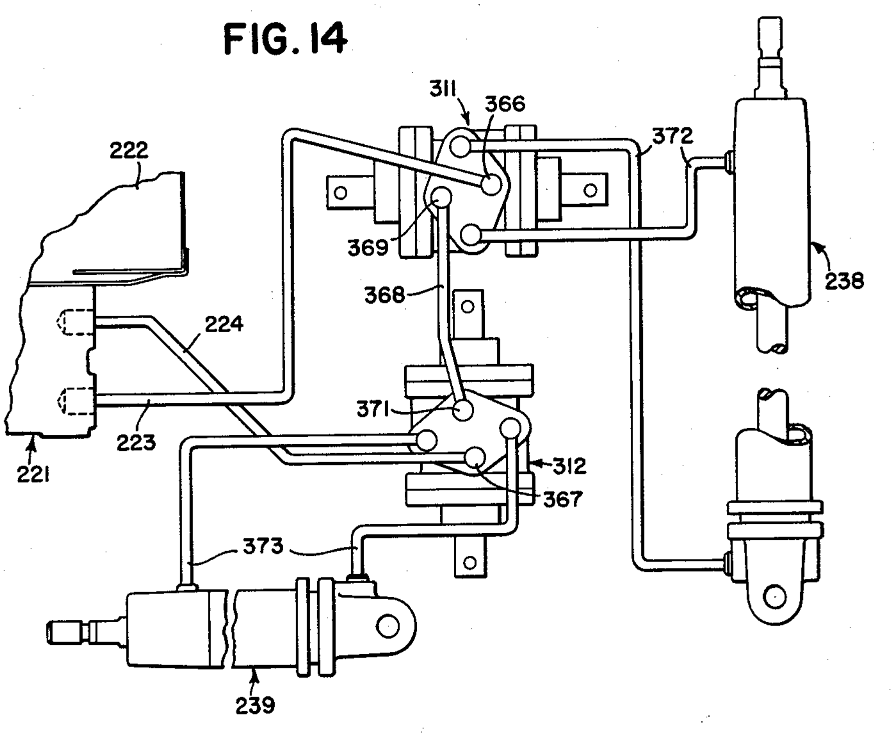
FIG. 14 is a diagrammatic view of the hydraulic circuits connecting the boom-shifting hydraulic power units with the associated hydraulic pump.

It will therefore suffice to note from FIGS. 10 and 14 that high and low pressure lines 223 and 224 extend from the pump 221 (FIG. 10) to high pressure connection 366 (FIG. 14) with the housing 316 of the upper valve 311 and to the low pressure connection 367 (FIG. 14) with the housing 316 of the lower valve 312. A high pressure line 368 leads from a connection 369 on the upper valve housing 316 to a connection 371 on the lower valve housing 316. A pair of cylinder hoses 372 leads from the housing of the upper valve housing to the vertical cylinder 238 and a second pair of cylinder hoses 373 leads from the lower valve housing to the horizontal cylinder 239.

Not shown in the schematic drawing of the hydraulic system (FIG. 14) is the internal overriding relief system which is comprised of a relief valve 374 (FIG. 20) which is incorporated into the system between hydraulic lines 368 and 224. This valve has a relief pressure substantially lower than the setting of the main system relief valve which is located internally in the hydraulic pump. When the boom is moved to either extreme of the horizontal movement and the operator continues to hold control lever in such a position as to keep the horizontal control valve 312 open after the horizontal control cylinder 239 has reached the end of its stroke, flow of oil is interrupted through the horizontal control valve and the main system relief valve opens. The overriding relief valve 374 opens before the main system relief valve, thereby dumping oil to the vertical control valve 311. This permits vertical control of the boom even through the operator may not have released the horizontal force on the control lever to permit oil flow through the horizontal control valve.

It will be seen from the above description and drawings that all controls are grouped on the pedestal for both the boom and the side nozzle.

A tank 15 carries hoist lugs 376 located near the center of gravity of the whole sprayer, whereby the latter may readily be lifted on and off the truck when desired. Further, according to this invention provision for detaching the complete boom for storage includes the removable bolts 53 and 292 and the coupling disconnect means at the outer end of the hose 172 (FIG. 19).

The operation of our sprayer as described above is substantially as follows.

FIG. 1 illustrates the spray boom in its transport position, the boom 56 being supported on the transport bracket 282 and the arm 263 (FIG. 9) being disconnected from the flange 266. After the truck is driven to the area of operation, the engine 160 is started and the boom 56 is swung around to a generally laterally outwardly extending position, and then the break pin 271 is inserted in the opening in the flange 266 and the opening 268 in the arm 263. This operatively connects the horizontal cylinder 239 with the boom and seat support 35, whereby by extending or retracting the cylinder 239 the boom 56 is swung between its laterally outer position and its generally rearwardly extending position. The cylinder 239 is extended or retracted, as desired, by the operator on seat 154 swinging the handle or lever 353 around to the right or left as viewed from the operator's seat 154. This movement of the handle 353 rotates the bracket 348 and the vertical primary control shaft 321 of the lower valve 312, and the movement of the shaft 321 of the lower valve directs fluid under pressure into one end or the other of the cylinder 239, thus swinging the boom and seat support around into the position. When further swinging of the boom and seat support is no longer desired, the handle 353 is held against further movement and the follow-up or secondary shaft 326 of the lower valve then changes the hydraulic circuits so that fluid is now locked in the cylinder holding the boom and seat support against further movement.

The handle or lever 353 may be also used for raising or lowering the boom. In order, for example, to raise the boom 56, the handle or lever 353 is lowered. This serves to rock the primary shaft 321 of the upper valve 311, which changes the hydraulic circuits so as to direct fluid under pressure through the hose lines 372 so as to extend the cylinder 238, which acts through the cross bar 291 to raise the boom. Similarly, if the handle or lever 353 is raised, hydraulic fluid is withdrawn from the cylinder 238 and the boom swings downwardly. The boom can be locked in any selected position merely by terminating movement of the handle or lever 353.

As will be seen from FIGS. 6, 12 and 20, the valve 171 controls the flow of spray material from the pump lines 167 and 169 to the boom 56, thus controlling the flow of material to the nozzles 86–90. The flow regulating valve 173, which per se is a conventional unit, maintains the desired operating pressure substantially constant. The valve **171*a* controls the flow of spray material to the side nozzle 183 (FIG. 1) through hose lines 178 and 179. The width of the spray from the nozzle housing 61 is controlled by pulling or pushing on the handle 146 to shift the selector plate 112 to different positions opening or closing the nozzle housing openings 91–95**.

What we claim, therefor, and desire to secure by Letters Patent is:

1. A spraying device comprising a frame, a tank carried by the frame, means fixed to the frame providing an upstanding part, a combined seat support and boom pivot rotatably mounted on said part and swingable relative thereto in a generally horizontal plane, a spray boom pivotally mounted adjacent one end on the upper end of said combined seat support and boom pivot and shiftable relative thereto in a generally vertical direction, nozzle means carried at the outer end of said boom, a power unit carried on said frame adjacent said tank, a pump connected to be driven by said power unit and arranged to draw material from said tank, flow control means carried by said combined seat support and boom pivot and connected between said pump and said spray boom, for controlling the flow to said nozzle means, and means connected with said power unit for swinging said combined seat support and boom pivot about said part and said boom about said boom pivot, optionally.

2. In a spraying device, a tank-supporting frame, means fixed to said frame providing an upwardly extending part, a combined seat support and boom pivot carried by said frame and shiftable relative to said part about a generally vertical axis, said combined seat support and boom pivot including a second upwardly extending part adapted to be disposed over said first part in rockable relation and a third upwardly extending part, an operator's seat carried by said third part, a spray boom pivotally mounted on the upper portion of said second part and swingable relative to said second part about a generally horizontal axis, a first hydraulic power operated unit connected between said frame and said combined seat support and boom pivot for shifting the latter about said first part, and a second hydraulic power operated unit connected between said second part and said boom for swinging the latter about said generally horizontal axis.

3. In a spraying device, a tank-supporting frame, means fixed to said frame providing an upwardly extending part, a combined seat support and boom pivot carried by said frame and shiftable relative to said part about a generally vertical axis, said combined seat support and boom pivot comprising a generally horizontal platform having adjacent one end an upwardly extending seat-receiving member and adjacent the other end an upwardly extending yoke, both fixed to said platform, said yoke including laterally spaced apart apertured portions, a spray boom, pivot means extending through said apertured portions for mounting the inner end of said spray boom on said yoke, a seat fixed to said seat-receiving member, and means acting between said frame and said platform for shifting said seat platform and boom about said upwardly extending part.

4. A truck mounted sprayer comprising a frame attachable to the body of the truck, a tank carried by the frame and extending above the sides of the truck body, a pedestal fixed to said frame adjacent the rear of the truck body at one side thereof and extending upwardly from the frame, a combined seat support and boom pivot mounted on said pedestal for swinging movement in a generally horizontal plane, a spray boom pivoted at its inner end portion to said boom pivot and swingable generally vertically relative thereto, a power actuated unit, means releasably connecting said spray boom with said power actuated unit whereby operation of the latter serves to swing said boom between a laterally outwardly extending position to a generally rearwardly extending position, and a boom transport support carried by the forward portion of said tank in a position to receive and support said boom when the release of said releasable connecting means frees said boom from said power operated unit and the boom has been swung around into a forwardly extending position.

5. A truck mounted sprayer as defined in claim 3, further characterized by means on said boom transport support for releasably locking said boom thereto.

6. In a sprayer, frame means including an upwardly extending pedestal having a shoulder thereon, an outwardly extending arm having an opening adjacent one end to accommodate passing said arm over said pedestal into a position against said shoulder, a boom-supporting pivot member mounted on said pedestal for swinging movement generally horizontally about said pedestal, said boom-supporting pivot member including an apertured flange at the lower portion adapted to overlie said one end of said arm, the latter being apertured to receive a pin extending through the aperture in the aperture in said flange, a spray boom connected with said boom-supporting member, and means connected with the other end of said arm for swinging said boom-supporting member and the associated boom generally about said pedestal as an axis, said pin being removable from said apertured parts to provide for movement of said boom relative to said arm.

7. The invention set forth in claim 6 further characterized by said boom-supported pivot member including a generally vertical pipe member receiving said pedestal and a yoke fixed to said pipe member, said yoke comprising a pair of upwardly and outwardly diverging parts fixed at their lower ends to said pipe member and a cross member interconnecting the upper ends of said diverging parts, said boom being pivoted to the upper ends of said diverging parts.

8. The invention set forth in claim 7 further characterized by said boom comprising a bifurcated member having spaced apart ends pivoted to the upper ends of the diverging parts of said yoke, a boom pipe fixed at one end to said bifurcated member, and a nozzle fixed to the other end of said pipe.

9. In a sprayer, frame means including an upwardly extending pedestal, a boom-supporting pivot member comprising a generally central pipe member adapted to be rotatably mounted on said pedestal and a pair of upwardly diverging members fixed at their lower ends to opposite sides of said pipe member below the upper end thereof, a spray boom pivoted to the upper ends of said upwardly diverging members, and generally vertically acting means connected between said pipe member between said upwardly diverging members and said boom for raising and lowering the latter.

10. The invention set forth in claim 6, further characterized by said arm having two pin-receiving apertures therein spaced apart angularly relative to the axis of said pedestal, said pin being insertable in either of said arm apertures and the aperture in said apertured flange.

11. In a sprayer, frame means including an upwardly extending pedestal, a boom-supporting pivot member comprising a generally central pipe member adapted to be rotatably mounted on said pedestal and a pair of upwardly diverging members fixed at their lower ends to opposite sides of said pipe member below the upper end thereof, a spray boom comprising an outer pipe section and an inner bifurcated section secured to the inner end of said pipe section and including a pair of laterally spaced apart portions, means pivoting the ends of said laterally spaced apart portions to the upper ends of said upwardly diverging members, a bar connecting the laterally spaced apart portions of said bifurcated section, and a hydraulic unit connected between said central pipe member and said bar for raising and lowering said boom.

12. The invention set forth in claim 11 further characterized by hydraulic controls for said boom comprising a member movable in opposite directions horizontally and in opposite directions vertically, a first hydraulic circuit means operated by horizontal movement of said member for shifting said boom horizontally, and a second hydraulic circuit operated by vertical movement of said member for shifting said boom vertically.

13. In a sprayer, a spray boom swingable both generally horizontally and generally vertically, a first hydraulic motor connected with said boom to swing the latter generally horizontally, a second hydraulic motor connected with said boom to swing the latter generally vertically, a source of fluid pressure, a first control valve including a generally horizontal control shaft, a valve housing receiving said control shaft, a follow shaft carried by said housing, said follow shaft being aligned with said control shaft means connecting said follow shaft with said boom so as to be operated by vertical movement of said boom, a second control valve including a generally vertical control shaft, a second valve housing receiving said vertical shaft, a follow shaft carried by said second housing and aligned with said vertical shaft, means fixing said first valve housing on the second control shaft, means holding said second housing against rotation about a vertical axis, means connecting said second follow shaft with said boom to swing therewith about said vertical axis, and hydraulic connections between said first and second control valves and said first and second hydraulic motors, respectively.

14. In a spray device, a frame, a tank carried by said frame, means carried by said frame and forming a generally vertical pivot, a combined seat support and boom pivot rotatably mounted on said vertical pivot and swingable generally horizontally about the axis defined by said pivot, a spray boom adapted to extend outwardly from said frame and mounted for generally vertical swinging on said boom pivot, a flexible fluid conduit with flow control means accessible to an operator on said seat support connecting said tank and boom, and power means having a control part also accessible to an operator on said seat support acting between said frame and adapted to swing said combined seat support and boom pivot about said vertical pivot.

15. In a sprayer, a mobile support, an outwardly extending boom pipe carried at its inner end on said boom, a nozzle housing fixed to the outer end of said boom pipe and including a plurality of nozzles extending radially outwardly from generally one side of the housing and disposed in a generally vertical laterally outwardly extending plane, progressively operable valve means in said housing for controlling the flow of spray material from said housing out through said nozzles, and additional nozzle means carried by the other side of said housing and communicating with the interior thereof independently of said valve means.

16. The invention set forth in claim 15, further characterized by said housing having a cover closing said other side of the housing, said additional nozzle means including a nozzle carried by said cover.

References Cited in the file of this patent

UNITED STATES PATENTS

| | | |
|---|---|---|
| 2,939,429 | Charlson | June 7, 1960 |
| 3,111,268 | Butler | Nov. 19, 1963 |

OTHER REFERENCES

Operator's Manual OM-B25059B of John Deere, 370 Sprayer, published April 1962.